July 22, 1958 E. M. CALLENDER 2,844,788
MAGNETIC SHEET DETECTING MEANS
Filed April 18, 1955 2 Sheets-Sheet 2

INVENTOR
Edwin M. Callender
BY
wm. R. Glisson
ATTORNEY

United States Patent Office 2,844,788
Patented July 22, 1958

2,844,788

MAGNETIC SHEET DETECTING MEANS

Edwin M. Callender, Cynwyd, Pa., assignor to The Budd Company, Philadelphia, Pa., a corporation of Pennsylvania Application April 18, 1955, Serial No. 501,873

1 Claim. (Cl. 324—34)

This invention relates to sheet detecting means, especially to means for detecting the number of sheets in a charge, and has for an object the provision of improvements in this art.

In previously used apparatus a search magnet, when brought into contact with the top of a sheet charge, indicated through a current responsive device, such as a differential relay, whether a given charge or more than a given charge or number of sheets was being presented, and if the charge is not excessive at a check period, an all-clear signal was given. The differential relay was located in a circuit of rectified alternating current to compare a fixed or standard current with a current derived from the search magnet. The search magnet coil current output was transmitted to the current comparator through a bridge circuit which compared reactance at the search coil with a standard reactance.

The prior arrangement was very sensitive to magnetic responses but was not too well suited to the high currents entailed in the magnetic saturation of thick sheets and required considerable time and skill to make adjustments for sheets of different thicknesses.

According to the present invention a circuit is provided which accommodates more readily to variations in sheet thickness while still giving good response distinction between the numbers of sheets in a charge at the desired distinguishing number.

The present apparatus also provides quicker and easier adjustment for different sheet thicknesses whereby the adjustment can be made by relatively unskilled operators.

Whereas the prior apparatus included a bridge circuit which was not adapted to handle large currents, the present apparatus comprises a resistance between the search magnet coil and the current comparator circuit which will accommodate relatively large currents. The search magnet current is made effective through a transformer and means are provided for safeguarding the transformer from core saturation and loss of transforming effectiveness due to excessive magnetizing currents required to saturate thick sheets.

The apparatus also embodies various fail-safe elements which assure that current is maintained on the comparator circuit, that current is maintained on the magnet, that the magnet rests properly on the sheet, and that no sheet in excess of the desired charge is present before the all-clear signal can be obtained.

An exemplary embodiment of the invention is illustrated in the accompanying drawings, wherein.

Figure 1:
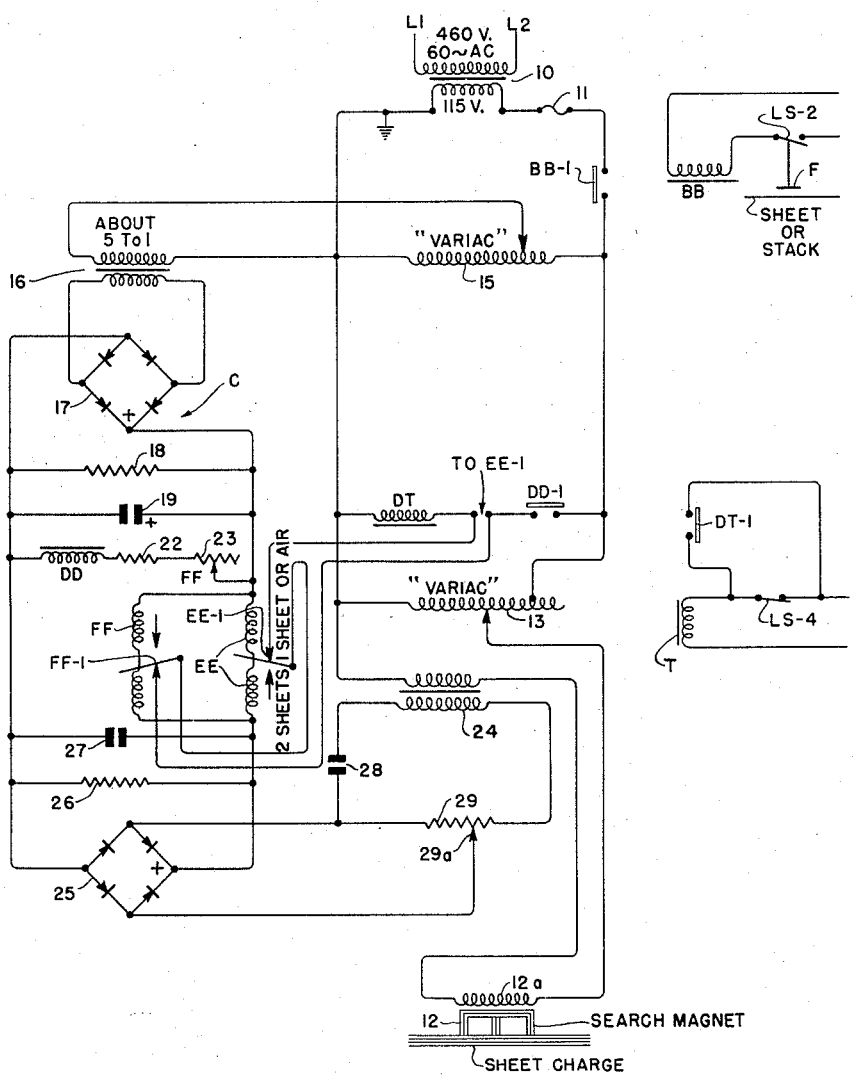
Fig. 1 is a circuit diagram.

As shown in Fig. 1, power is provided for the search magnet and its control circuit from a power source L1, L2. This may be high voltage alternating current such as 460 volt, 60 cycle normal commercial current. The voltage is stepped down to about 110–115 volts at a transformer 10. A fail-safe condition against excess current is provided by a fuse or circuit breaker 11.

The detector is adapted to be used with a sheet lift which has suction cups or lift magnets which engage the top of a stack of sheets and lift one or more sheets in a charge which is raised and passed along to related mechanisms. Such a sheet feeder is disclosed in the copending application of Michael Watter, Serial No. 499,323, filed April 5, 1955, now Patent No. 2,815,948, issued December 10, 1957. A search magnet 12 may be carried by such a lift in a position to engage the top of the sheet charge which is engaged and raised by the lift. The magnet is preferably of the closed circular or semi-closed type which concentrates the magnetic effect within a small area.

Power is applied to the detector circuit by the closure of a switch BB–1 of a relay BB which is in the power circuit of the lift or such other device as may require the use of the search magnet detector. The relay BB may be energized, for example, by the closure of a limit switch LS–2 when a feeler F is brought down against the top of the stack by the lift. The feeler switch LS–2 will remain closed as long as a sheet charge is held up on the lift.

Current is transmitted to the magnetizing coil 12a of the magnet 12 through a variable transformer or "variac" 13 which is adjusted for different sheet thickness demands to set the magnet coil voltage at the proper level, which is generally in the order of about 90 to 120 volts, depending on sheet thickness. After initial installation set up and adjustment the change at the "variac" 13 for the nominal thickness of sheets being handled is about the only adjustment which the operator will be required to make and the "variac" scale may be marked in sheet thickness so that no particular skill or training will be needed to operate the detector. The range of adjusted voltage by the "variac" 13 may be from 50 to 135 volts, depending on thickness.

The detector magnet 12 makes its effects manifest through a comparator or differential circuit which is generally designated by the letter C.

Alternating reference current is supplied to the circuit C from the main detector circuit through a variable transformer or "variac" 15 and a transformer 16 which may, for example, reduce the voltage from about 115 volts to about 24 volts. Current from the secondary of the transformer is rectified by a full-wave rectifier 17 and the voltage is limited by a resistor 18 and capacitor 19.

The presence of current across the detector circuit is registered by a relay coil DD which when energized closes its switch DD–1 in the line to the final detector relay DT. This provides a fail-safe condition if there is no current or less than a predetermined current in the detector-comparator circuit. A fixed resistance 22 and a variable resistance 23 are in the line to the coil DD.

The search magnet coil 12a makes its effects manifest for comparison with the standard current derived from the transformer 16 and rectifier 17 through a transformer 24, a full-wave rectifier 25 and voltage stabilizing means comprising a resistance 26 and a capacitor 27. A capacitor 28 is arranged in series with the secondary of transformer 24 to provide fundamental resonance (approximately) for reduction of harmonics. A variable resistance 29 is placed in circuit with the transformer secondary, one side of the resistor being connected to one of the input connections of the rectifier 25 and the tap 29a of the resistor being connected to the other input connection of the rectifier. The voltage drop across the resistance 29 from the tap can be taken as the effect produced by variations in current by change in flux at the search magnet.

The net effect produced by comparison of the rectified magnet current and the rectified comparison current is registered by a polarized differential relay EE. If there is one sheet or no sheet, one contact EE-1 of the relay will be closed. If there are two sheets, the contact EE-1 will be opened. The reference to the difference between one and two sheets is given merely by way of example; it might well be a difference between two sheets and three sheets or between three and four, etc. However, as the number of sheets increases, the differentiation becomes less distinct.

Another differential relay FF which is oppositely polarized and connected may, if desired for a further safeguard, be provided to distinguish between lesser numbers of sheets, in the example between one sheet and air. The relay FF has a contact FF-1 which is closed if one sheet is present but which is open if one sheet is not present. This insures that the magnet is squarely seated on the stack and not tilted to one side or resting on a local projection. This provides another fail-safe condition.

If the contacts EE-1 and FF-1 are closed (and assuming DD-1 to have been closed), the relay coil DT will be energized to close a switch DT-1 in the control circuit of the related machine. During a check period of the machine a limit switch LS-4 is opened and if at this time the detector switch DT-1 is closed, a relay coil T of the machine will remain energized, but if DT-1 is not found to be closed to show that the correct sheet charge has been lifted, the coil T will be deenergized and the action of the related machine (here the sheet lift and feeder) will be halted.

The detector is adapted to cover a wide range of sheet thicknesses, say .020" to .250", yet it accepts normal unavoidable rolled sheet tolerances, say up to 20 or 25%, without giving a false signal. Tolerance is primarily dependent on the sensitivity of the differential relay and is therefore adjustable.

Figure 3:
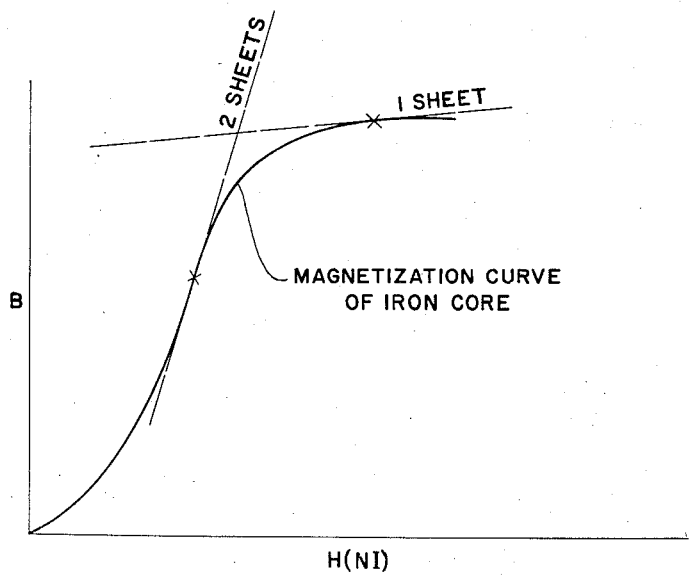
Fig. 3 is a typical magnetization B–H curve for an iron core which saturates for one sheet.

The principle of operation will be understood from the illustration and above description. The magnetization curve of an iron core is well known. One such curve is shown in Fig. 3 for reference. This is based on saturation for one sheet of a given thickness. This shows that near saturation a given increase in magnetizing force (H or NI) gives less flux (B) increase per unit than at points below the saturation point. If two sheets are present, the flux density will fall far below the saturation point. The adjustment is about the knee of the curve near the saturation point. It will be understood that various sheet thicknesses will require different settings for saturation levels and this is provided by the "variac" 13.

The magnet coil, acting much like a transformer, maintains a relatively constant total flux under various sheet charge conditions (number of sheets). Single sheet saturation or a no-sheet condition lead to large magnet coil currents as compared to the presence of two sheets at the magnet. The current may be reduced as much as 50% between one and two sheet conditions. This current change is detected by potential (IR) drop across the resistor 29 and is reflected in the differential relays EE and FF.

The combination of capacitor 28 and resistor 29 gives a very broad (low Q) resonance, acting as described below to augment signal changes as the inductance of the search magnet is caused to change and shift further from resonance during detection. Therefore, within the capability of the circuit components and source power the "variac" 13 can be adjusted for detecting at saturation anything from very thin sheets up to quite thick sheets (see above). For thicker sheets the action can be improved to avoid errors due to eddy current losses by reducing the frequency, say from 60 to 25 cycles.

The detector generally compensates for changes in line source voltage over a considerable range. The setting of the magnetizing current of the search magnet coil is not overly critical. Hence with changes in line voltage the comparator voltage and signal voltage will change together. This aids in holding to any given adjustment without serious difficulty. In practice the adjustment is centered with respect to the range voltage for any given metal thickness. Excellent compensation for line voltage changes is attained and in the most critical gage (thick sheets) a plus and minus 10% regulation is currently acceptable without touching the adjustments of the apparatus.

Since the primary voltage at the transformer 24 is quite small the transformer is very sensitive to impressed voltage, current, and phase shift of current. The arrangement of the capacitor in series with the resistor 29 in the secondary circuit of the transformer improves the power factor and in other ways augments the percent signal change. The effects of phase and impedance change in the circuit may be considered from a series resonance standpoint. The capacitative reactance is reflected into the primary and "detection shifts" toward or away from resonance occur, depending on the inductance of the search magnet coil. If the secondary resistance were made small, very large signal percent changes would occur (up to 300%), but the transformer core then enters a second mode of magnetization, resulting in a complete loss of signal change. The secondary resistance 29 is made sufficiently great to prevent this instability. A 50 ohm, 160 watt resistance has been used. The signal is tapped, at 29a, from a portion of this resistance. The use of the transformer, capacitor and resistor instead of a series primary resistor results in improved percentage changes of the detecting signal, up to 3 to 10 times as great.

Loss of voltage results in a plural sheet signal; breakage of a conductor results in a plural sheet signal; a short to the magnet results in a blown fuse (11) and a plural sheet signal; loss of voltage across the comparator circuit at DD results in a plural sheet signal; and an improper position of the magnet will result in the operation of the no-sheet relay FF—all fail-safe provisions.

Figure 2:
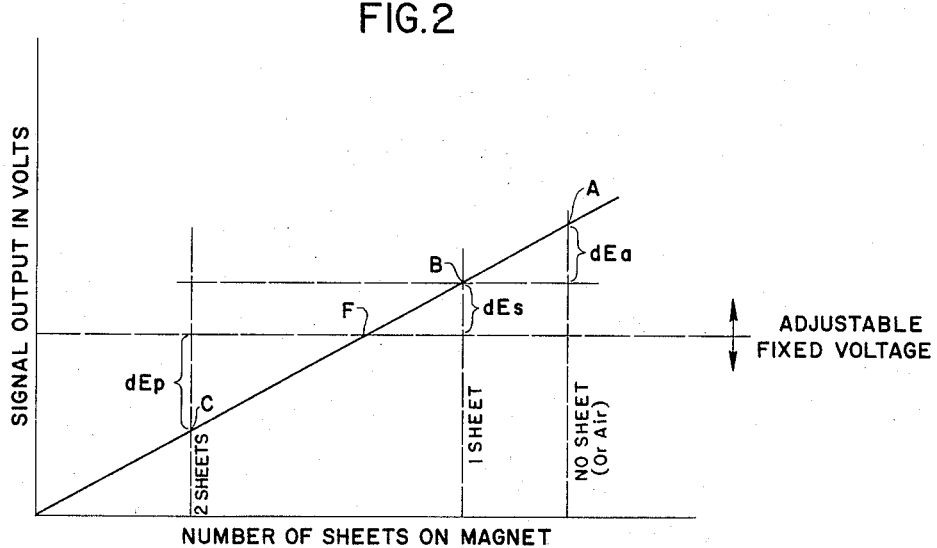
Fig. 2 is a diagram showing magnet output voltage plotted against magnet sheet charge conditions.

It can be seen from Fig. 2 how the relays EE and FF act. Relay EE detects sheets for the signal voltage $dE_p$ (here two sheets); and relay FF is not actuated for $dE_s$ (one sheet) but is actuated for $dE_s$ plus $dE_A$ (no sheet).

It is thus seen that the invention provides an improved means for detecting the number of sheets in a charge; that the apparatus is simple and rugged; and that adjustments for different sheet thicknesses can be very simply and quickly made.

While one embodiment of the invention has been described by way of illustration, it is to be understood that there may be various embodiments and changes within the general scope of the invention.

What is claimed is:

Means for detecting the thickness of a sheet charge of magnetizable sheets and discriminating between a greater or less number of sheets of a given thickness, comprising in combination, a polarized differential relay, means for supplying a rectified alternating reference current from a source to one side of said differential relay, a search detector electromagnet adapted to be brought into engagement with a sheet charge, means for supplying alternating current of selected voltage from the same source to the coil of said magnet, means including a transformer for supplying rectified alternating current from the supply line of said magnet to the side of said differential relay opposite that supplied with reference current, and a voltage drop resistance in the secondary circuit of the transformer between said magnet coil and differential relay for registering voltage changes at the magnet coil for different numbers of sheets in a charge, and a second oppositely polarized and connected differential relay in parallel with the first said differential relay, the first relay distinguishing between a lesser and greater sheet charge and giving a signal at a greater sheet charge and the second relay distinguishing between the lesser sheet charge and no charge or air and giving a signal at no charge.

References Cited in the file of this patent

UNITED STATES PATENTS

| | | |
|---|---|---|
| 2,155,267 | Hathaway | Apr. 18, 1939 |
| 2,331,418 | Nolde | Oct. 12, 1943 |
| 2,481,345 | Reynst | Sept. 6, 1949 |
| 2,523,717 | Pfleger | Sept. 16, 1950 |
| 2,700,132 | Kuehne | Jan. 18, 1955 |
| 2,721,297 | Estelle | Oct. 18, 1955 |